Dec. 24, 1963  M. A. BRAMSON  3,114,964
AUTOMATIC TOOL CHANGER
Filed Oct. 21, 1960  5 Sheets-Sheet 1
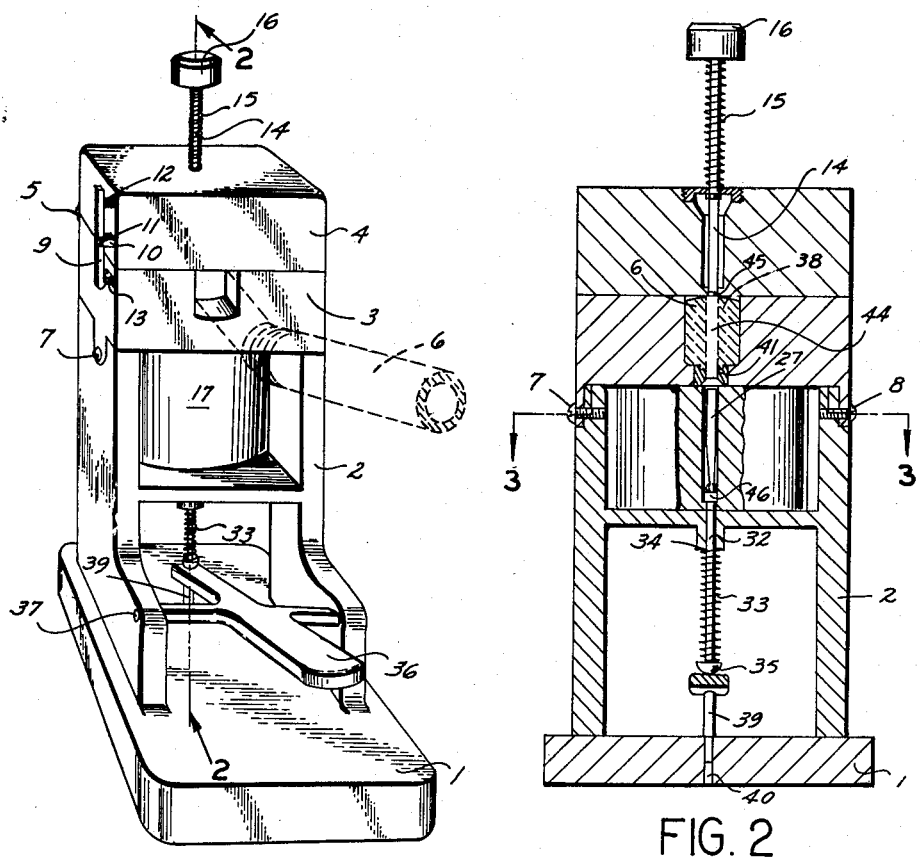
FIG. 1
FIG. 2
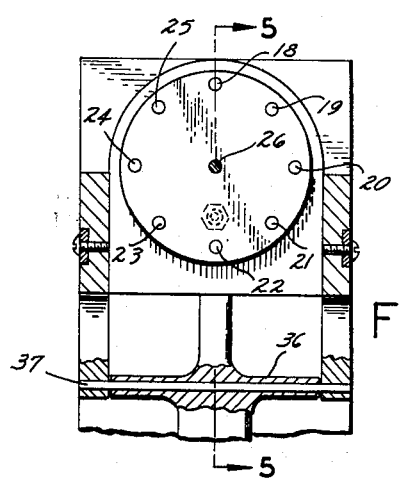
FIG. 3
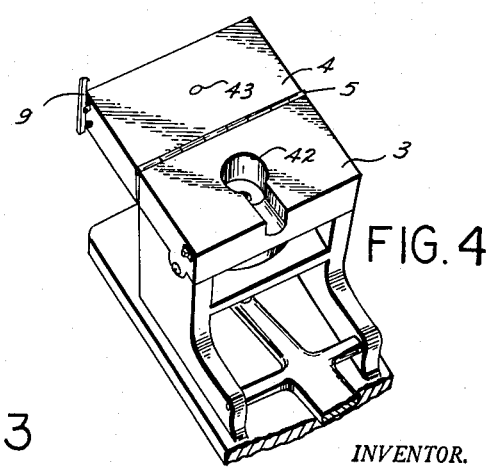
FIG. 4
INVENTOR.
M. A. BRAMSON
BY
R. E. Beaugue
ATTORNEY Dec. 24, 1963   M. A. BRAMSON   3,114,964
AUTOMATIC TOOL CHANGER
Filed Oct. 21, 1960   5 Sheets-Sheet 2

INVENTOR.
M. A. BRAMSON
BY
*R. E. Geangue*
ATTORNEY

Dec. 24, 1963     M. A. BRAMSON     3,114,964
AUTOMATIC TOOL CHANGER

Filed Oct. 21, 1960     5 Sheets-Sheet 3

INVENTOR.
M. A. BRAMSON
BY R.E. Geangue
ATTORNEY

Dec. 24, 1963   M. A. BRAMSON   3,114,964
AUTOMATIC TOOL CHANGER
Filed Oct. 21, 1960   5 Sheets-Sheet 4
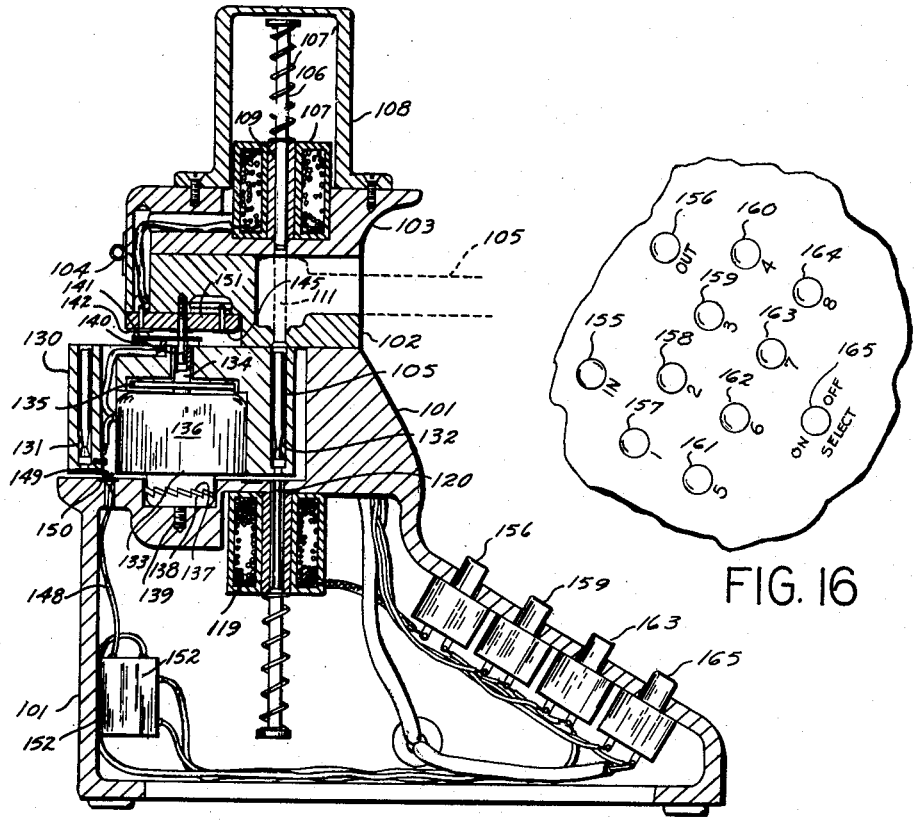
FIG. 15
FIG. 16
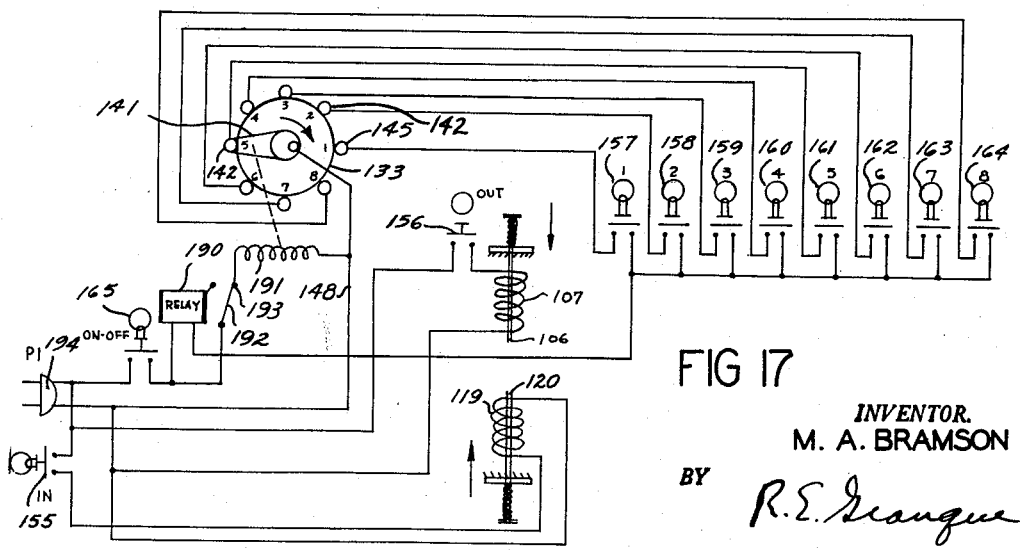
FIG 17
INVENTOR.
M. A. BRAMSON
BY
*R. E. Granque*
ATTORNEY Dec. 24, 1963   M. A. BRAMSON   3,114,964
AUTOMATIC TOOL CHANGER
Filed Oct. 21, 1960   5 Sheets-Sheet 5
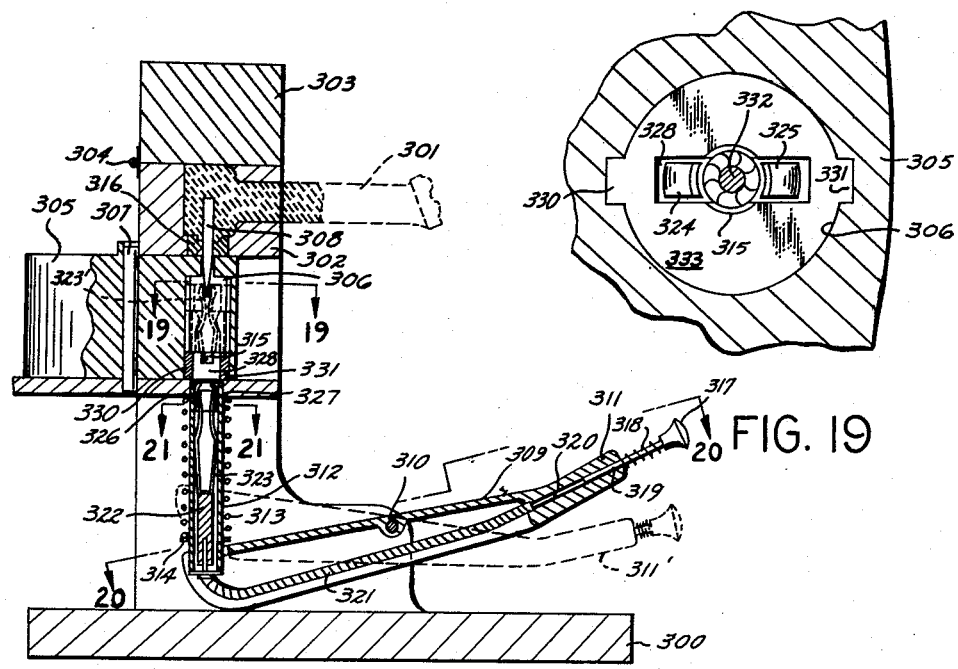
FIG. 18
FIG. 19
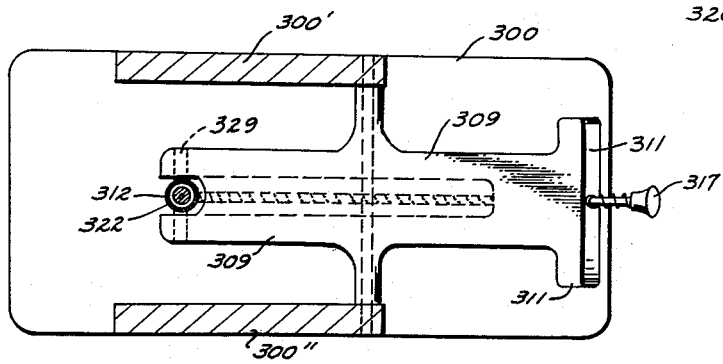
FIG. 20
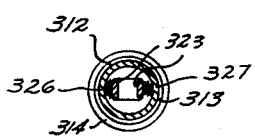
FIG. 21
INVENTOR.
M. A. BRAMSON
BY
R. E. Grangue
ATTORNEY

United States Patent Office 3,114,964
Patented Dec. 24, 1963

3,114,964
AUTOMATIC TOOL CHANGER
Marvin A. Bramson, 9712 Tunney Ave.,
Northridge, Calif.
Filed Oct. 21, 1960, Ser. No. 64,052
34 Claims. (Cl. 29—212)

This invention relates to an automatic tool changer and more particularly, to one having a magazine adapted to receive a plurality of tools and means by which a selected one of said tools may be inserted into, or withdrawn from said magazine and/or the tool chuck of a related machine.

Heretofore, machines adapted to operate with any one of a variety of rotary tools such as drills, burrs, grinding wheels, reamers, etc. have generally been provided with a revolving turret which carried a plurality of tools and upon revolving the turret to a selected position, a particular one of said tools could be brought into operating position. However, certain types of rotary machines do not lend themselves to the multiple-head or turret-type of tool changer. For example, a dental handpiece, because of its very small size and for other obvious reasons, is not suitable for receiving a turret-type of tool changer as an integral part of the handpiece. For this reason, dental handpieces have required that tools be manually inserted or withdrawn from the tool collet or chuck.

According to the present invention, there is provided an automatic tool changer existing apart from the utilizing machine which carries a plurality of tools and is capable of introducing or removing said tools from the machine. As will become apparent from the following specification, the apparatus is applicable to a variety of situations; however, for purposes of teaching the invention, consideration of the structure with reference to its application as a tool changer for a turbine dental handpiece is considered to be particularly apt.

A preferred embodiment of the invention, adapted for use in connection with a dental handpiece, results in a number of advantages. For example, it permits one-hand operation for changing tools, encourages changing to the proper tool for performing a better function, and results in longer chuck life as a result of more accurate alignment when inserting and removing the tools. Similarly, the tool life is increased by the elimination of lateral thrust during insertion of the tool. There is less danger of damaging the handpiece turbine and its bearings as a result of a more accurate alignment of the tool during its insertion. An obvious advantage is the maintenance of sterility of the tools since they need not be touched by hand to insert or withdraw them from the handpiece. An attendant advantage of the invention is that it provides a convenient holder for the handpiece when it is not in use. These and other advantages of the invention will become more apparent after reviewing the following specification and drawings in which:

FIGURE 1 is a perspective view of one form of the apparatus.

FIGURE 2 is a sectional view of the apparatus of FIGURE 1 taken along line 2—2.

FIGURE 3 is a sectional view of the apparatus of FIGURES 1 and 2 taken along line 3—3.

FIGURE 4 is a fragmentary perspective view of the apparatus of FIGURE 1 showing the handpiece receiving vise in an open position.

FIGURE 15 is a sectional view of a power-operated modification of the invention.

FIGURE 16 is a fragmentary plan view of the keyboard portion of the apparatus of FIGURE 15.

FIGURE 17 is a schematic diagram showing the electrical circuitry of the apparatus of FIGURE 15.

FIGURE 18 illustrates a modification of the invention adapted to insert and withdraw a tool from the same side of the tool-receiving collet or chuck.

FIGURE 19 is a fragmentary sectional view taken along line 19—19 of FIGURE 18.

FIGURE 21 is a sectional view taken along line 21—21 of FIGURE 18.

FIGURE 20 is a sectional view taken along line 20—20 of FIGURE 18.

Figure 5:
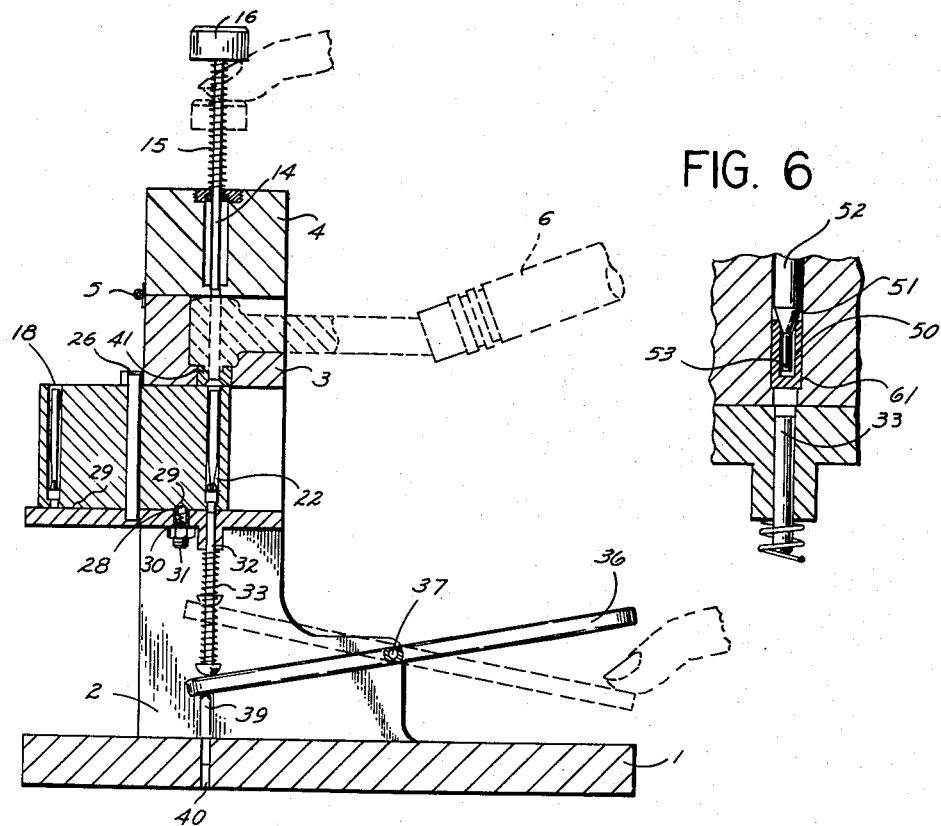
FIGURE 5 is an elevational view, partially in section, of the apparatus of FIGURE 1 illustrating its operation.
Figure 6:
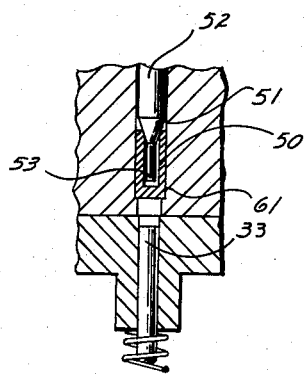
FIGURE 6 is a fragmentary sectional view showing a modification of the apparatus for accommodating certain types of tools.

Looking now at FIGURE 1, the apparatus comprises a base 1 upon which is carried a frame 2. A handpiece-receiving vise comprising stationary portion 3 and relatively movable portion 4, pivotally mounted on hinge 5, is adapted to receive the head of hand-piece 6. This portion of the device serves to hold the handpiece and accurately align the tool chuck relative to the tool insertion and tool ejection mechanism. The vise 3 is attached to frame 2 by means of screws 7 and 8 or other suitable means. In the closed position, the vise sections 3 and 4 may be locked together by means of a catch assembly comprised of catch 9, yoke 10, shaft 11, spring 12, and detent 13.

The tool removing or ejector assembly comprises a tool ejection plunger 14 which is urged into a retracted position by spring 15 carried between vise 4 and plunger handle 16. Any suitable means may be employed to limit the upward and downward travel of ejection plunger 14 as will be apparent to those skilled-in-the-art.

Latch 9 prevents the upper portion 4 of the vise from inadvertently opening as a result of the upward pressure of the tool insertion operation. There is carried directly beneath the vise a removable and interchangeable tool storage magazine 17. In the embodiment of FIGURE 1, magazine 17 has a cylindrical configuration; it may, however, be of other suitable configurations as will be discussed in a subsequent section of this specification. Magazine 17 is provided with a plurality of storage chambers 18 through 25. The magazine 17 is adapted to rotate about the axis of shaft 26. Each storage chamber is adapted to receive and carry an individual tool of which 27 is typical. The magazine 17 may be detented at each storage position by any suitable means such as ball-detent 28 which is urged into depression 29 by spring 30 carried within adjustable screw 31.

A tool insertion pin 32 is urged into its retracted (downward) position by spring 33 carried between boss 34 and head 35. Operating lever 36 is pivotally mounted on shaft 37 carried between the yoke portion of frame 2.

Figure 10:
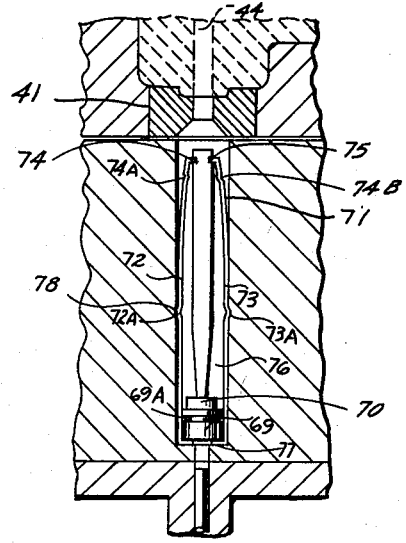
FIGURE 10 illustrates a modification of the magazine of the apparatus.

A downward depression on the extended handle portion of lever 36 will urge pin 32 upward thereby forcing tool 27 into the receiving opening of the vise and thence into the tool collet or chuck of the handpiece. Handle 36 is limited in its downward motion by stop 39 inserted into base 1 via aperture 40. It should be understood that magazine 17 is selectively rotatable about the axis of shaft 26 to bring into position a desired tool chamber 18–25. Indicia may be provided on the magazine to aid in identifying the various tool chambers 18–25 and thus facilitate the selection of the desired tool for insertion into the handpiece 6. If desired, the magazine may be fabricated from a transparent material to permit the various tools carried therein to be seen. There is located between vise portion 3 and the upper surface of magazine 17 a tool shank positioning and chuck holding fork 41. This fork 41 is mechanically linked to movable vise portion 4, by any well-known and suitable means so that it will be slidably retracted whenever the vise is open, and conversely, will be slidably positioned into axial alignment with aperture 43 when the vise is closed. When in position under the handpiece chuck, fork 41 serves to prevent the total chuck 44 from coming out with the tool during the tool ejection operation and also serves as a guide to accurate entrance of the tool shank into the tool chuck 44 during the tool insertion operation. The retraction of sliding fork 41 will also permit tools having large heads to be properly withdrawn from the magazine, as will become more readily apparent in connection with the discussion of the apparatus of FIGURES 10–12 in a subsequent section of this application.

Looking now at FIGURE 4, the vise portion of the apparatus is shown in its open position for receiving the dental handpiece. Opening 42 in vise portion 3 is shaped to receive the head of handpiece 6. After the handpiece has been placed into opening 42, vise cover 4 is closed by swinging along hinge 5 and locking in place by means of latch 9. This will position aperture 43 directly over the top opening in the dental handpiece.

It should be understood that the embodiment of the apparatus shown in FIGURES 1 through 4 is particularly adapted for use with handpieces in which there is an axial opening passing completely through the rotating tool-driving element along the axis of rotation of the tool holding chuck. Handpieces of this type have been designed so that the tool is inserted by an upward pressure into the tool chuck and tool removal is effected by the insertion of a manual tool removing pin inserted through the upper opening of the handpiece head after which downward pressure is exerted thereon to eject the tool. As is well known to those skilled in the art, certain types of dental handpieces are not provided with a continuous axial opening along the axis of rotation of the tool chuck. Therefore, as will be discussed hereinafter, a modified embodiment of the invention has been contemplated in which the tool is removed by suitable means which grasp the tool and exert a downward, withdrawing motion rather than a downward pushing motion of the above described embodiment.

Operation of the apparatus, as described thus far, is as follows: Assuming that there is no tool in the dental handpiece, the vise is opened and the head of the handpiece is manually inserted into receiving opening 42. Fork 41 will be in a retracted position. Thereafter the vise is closed and locked in place by means of latch 9. Fork 41 will then slide into place under the handpiece tool chuck. Magazine 17 may then be rotated to a selected position as necessary to index and detent the desired tool under the handpiece tool chuck. Handle 36 is thereafter depressed which results in pin 32 being urged upward. Pin 32 will engage insert 46 which will in turn engage the lower end of tool 27 and urge it upward through the opening in fork 41 into tool chuck 44 in the head of handpiece 6. Upon releasing handle 36, spring 33 will restore it to its initial position, thus retracting pin 32. Tool 27 will then have become frictionally engaged with chuck 44. Latch 9 is released and vise head 4 is swung open, thus retracting fork 41. The handpiece 6 carrying the inserted tool may then be withdrawn.

When it is desired to remove and/or replace the tool in the handpiece 6, the handpiece head is inserted into opening 42. The vise cover 4 is thereafter locked by latch 9. Magazine 17 is indexed so that an open or empty tool chamber (18–25) is in position to receive the tool from the handpiece. Thereafter, actuating knob 16 is depressed downward causing plunger 14 to enter opening 45 in the top of handpiece 6. This action will urge the tool 27 downward from chuck 44 causing it to be ejected into the receiving storage chamber in magazine 17. The extended fork 41 will prevent the chuck 44 from also being ejected downward. Upon releasing the pressure applied to knob 16, spring 15 will urge plunger 14 upward. Magazine 17 may then be rotated about the axis of shaft 26 to bring a new tool storage chamber (18–25) into position in order to permit a new tool insertion operation, as described in the preceding paragraph to be initiated.

As will become apparent to those skilled in the art, certain detailed modifications of the structure may be made in order to accommodate a variety of tool configurations. For example, certain types of tools have fragile and/or delicate ends which may not be suitable for having applied thereto an end thrust without resulting damage. Accordingly, the tool storage chamber may be provided with an insert sleeve 50 which will transfer the force applied by pin 33 to the shoulder or chamfer 51 of tool 52 rather than to the fragile end 53 thereof. A shoulder 61, provided by a slightly reduced diameter portion of the storage chamber prevents insert sleeve 50 from falling out of the magazine. Similarly, shoulder 61 will prevent insert 46, referred to in the preceding embodiment, from falling out of the magazine.

Another modification contemplated is the inclusion of a frusto-conical opening in vise portion 62 and a vise cover 55 of complementary configuration. This will provide a funnel-shaped opening which will guide the head of handpiece 6 into position thereby facilitating the operation of the apparatus and enhancing its "one hand" operation.

Figures 7, 8:
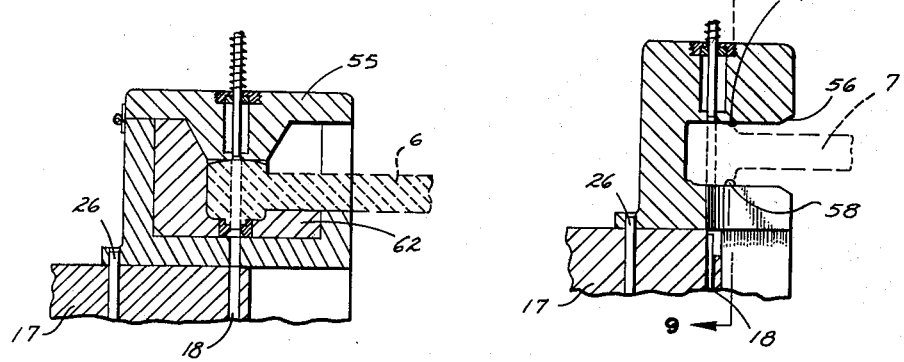
FIGURE 7 is a fragmentary sectional view showing a modified form of the vise portion of the apparatus.
FIGURE 8 is a fragmentary sectional view showing an alternative embodiment of the vise portion of the apparatus.
Figure 9:
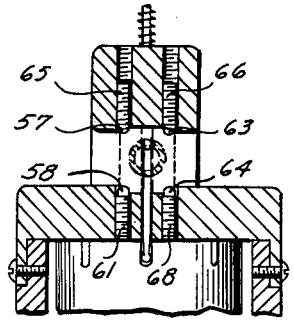
FIGURE 9 is a fragmentary sectional view taken along line 9—9 of FIGURE 8.

If desired, the two-part (3 and 4) hinged configuration of the vise may be replaced with a unitary vise structure of the type shown in FIGURES 8 and 9. In this modification, the head of the handpiece 6 is inserted laterally into a receiving opening 56 and urged into a seated position by means of detents 57 and 58. As can be seen in FIGURE 9, four detents may be provided (57—58, 63—46) these being retained by means of set-screws and springs 65—68.

Figure 11:
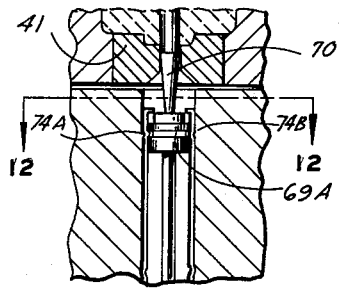
FIGURE 11 illustrates functioning of the apparatus of FIGURE 10.
Figure 12:
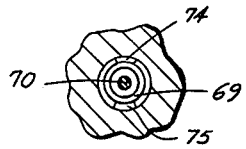
FIGURE 12 is a sectional view taken along line 12—12 of FIGURE 11.

The majority of burrs used in the dental profession have cutting heads which are smaller than the diameter of the tool shank. However, certain types of tools, such as grinding stones and the like, have enlarged end portions as compared with the diameter of the tool shank. A tool of this type is shown at 70 in FIGURE 10. In order to provide the accurate axial alignment necessary to properly guide the tool shank into the receiving chuck of the handpiece, a guide member 71 may be provided. Guide member 71 is provided with a pair of leaf-spring extensions 72 and 73 extending upward from and loosely fitting about an insert member 69. These extensions 72 and 73 serve as shank centering arms; each has a right-angle finger portion (74 and 75) which engages the upper end of the tool shank and thereby maintain its axial alignment. Normally the finger portions 74 and 75 are substantially closed about the shank of the tool. The upward motion of insertion pin 33 urge insert 69 against the head of tool 70 thereby forcing the shank of the tool into chuck 44. Guide member 71 will be retained in the magazine chamber 76 by the crimped or dimpled portions 72A and 73A which are urged into mating engagement with annular groove 78 recessed in the wall of the magazine chamber. At the upper limit of travel of insert 69, annular groove 69A will engage crimped portions 74A and 74B of extensions 72 and 73; this action will keep fingers 74 and 75 in an open or spread position as shown in FIGURE 11 until a tool is re-inserted into the magazine chamber 76. As can be seen in FIGURE 11, clearance is provided between the finger portions 74 and 75 to permit the head of the tool 70 to pass through. During the tool insertion operation fork 41 will have served to aid in guiding the shank of the tool into the chuck. Upon opening the vise the fork will be retracted thus permitting the large head portion of the tool to be withdrawn from the device. The insert 69 and the guide member 71 are prevented from falling out of the bottom of the chamber 76 by shoulder 77 having a relatively smaller diameter.

Various means will suggest themselves by which the magazine 17 may be removed from, or re-inserted into, the apparatus. This operation may be desirable for several reasons, one of which is to permit sterilization of the various parts. This feature may be enhanced by means of the alternative embodiment of the magazine shown in FIGURES 13 and 14.

Figure 13:
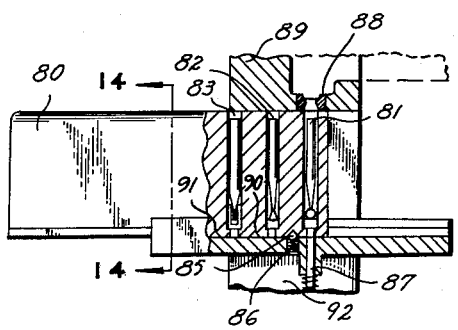
FIGURE 13 illustrates a rectilinear embodiment of the magazine which may be used in lieu of the cylindrical configuration shown in FIGURE 1.

Looking now at FIGURE 13 there is shown an embodiment of the magazine apparatus adapted for rectilinear movement as contrasted with the rotary movement of the magazine of FIGURE 1. Magazine 80 comprises an essentially rectangular or tray-like member having a plurality of transversely disposed storage chambers 81—83. A stationary keyed base track 84 carries magazine 80 in slidable engagement. Ball 85 and detent spring 86 positively index the magazine 80 at selectable positions relative to insertion pin 87 and the vise opening 88. Detent recesses 90—91 are indexed relative to the various chambers 82—83 etc. Track 84 may be an integral portion of the frame 92, thus permitting the magazine 80 to be completely withdrawn from the apparatus.

Figure 14:
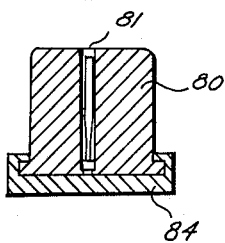
FIGURE 14 is a cross-section view of the magazine of FIGURE 13 taken along line 14—14.

It will be obvious that the various modifications discussed in connection with FIGURES 6, and 10–12 may be incorporated into the magazine modification of FIGURES 13 and 14. Also, it should be understood that the magazine may be relatively stationary while the remaining elements are relatively movable; thus, indexing would be accomplished by a relative motion of the tool and the tool-holding fixture or vise.

There is shown in FIGURE 15 an embodiment of the invention employing power-operated elements for inserting and removing a selected tool, and for indexing the tool magazine in response to a selected key on a keyboard, in contrast to the manually operated embodiments described thus far. The description of the power operated model which follows is directed to an electrically actuated embodiment utilizing solenoids as the electromechanical actuators. It will be obvious to those skilled-in-the-art, however, that electric motors may be substituted as being essentially equivalent to the solenoids shown. Also, it will be apparent that pneumatic or hydraulic actuators, or their equivalents, could be used in place of solenoids.

Looking now at FIGURE 15, the apparatus is supported and partially contained within frame 101. The lower portion of the vise 102 is carried on the upper portion of frame 101 and is attached thereto by any suitable fastening means. The cover portion of the vise 103 is connected to vise portion 102 by a hinge 104. This permits the cover portion to be swung upward and open to permit the handpiece 105 to be inserted in the vise. A tool or burr carried within handpiece 105 may be ejected by solenoid operated ejector plunger 106. Solenoid 107 carried within casing 108 carries a hollow cylindrical armature 109 through which plunger 106 may pass. Plunger 106 is normally urged in a withdrawn position by coil spring 107'. Upon being energized coil 107 will cause plunger 106 to be urged downward whereupon it will enter axial opening 111 comprising the chuck of handpiece 105. This action will eject any tool carried within handpiece 105 downward into the magazine tool chamber or receptacle.

Magazine 130, as seen in FIGURE 15, is a modification of the cylindrical type shown at 17 in FIGURE 1. It resembles the previously described magazine in that it is provided with a series of tool chambers or compartments, of which 131 and 132 are typical, radially disposed about the axis of the cylinder. A rotary solenoid, generally designated at 133, is carried within the hollow center portion of magazine 130 and is fixedly attached thereto. Shaft 134 carries thereon a disc 135 having a plurality of arcuate ramp-like depressions circularly disposed about the axis of shaft 134, in the manner of conventional and well-known rotary solenoids. Each of these depressions carry a ball bearing between disc 135 and the upper surface of case 136. This mechanism converts the downward stroke of the disc 135, which acts as the armature of the solenoid, to a rotary motion of shaft 134. The lower end of shaft 134 carries ring 137 having a series of ratchet teeth disposed about its base periphery. These ratchet teeth are adapted to engage with mating teeth carried on member 138 which is attached to frame 101 by screw 139 or other suitable fastening means. The upper end of shaft 134 is hollow and is adapted for rotation about shaft 140, threadedly attached to frame 101, which serves to center the solenoid mechanism about its axis of rotation.

Whenever solenoid 133 is energized, disc 135 will be urged downward toward solenoid case 136; this will cause the teeth of 137 and 138 to become engaged thus holding shaft 134 in a relatively fixed position. Since disc 135 is now fixed, case 136, magazine 130, and the other parts fixedly attached thereto, will be caused to rotate. The rotation of solenoid 133 will cause wiper contact 141 to sequentially sweep over contacts 142, 145, etc. One terminal of the solenoid winding connects to wiper contact 141 and the remaining terminal of the solenoid winding connects to wiper contact 149. Contact 149 in turn communicates with slip ring 150.

When solenoid 133 is de-energized, ring 137 will move upward with shaft 134 thus disengaging from teeth 138; a spiral spring within solenoid 133, which will have become wound as a result of the rotation of case 136 relative to shaft 134, will then unwind, thus rotating shaft 134 to the new position of case 136. If desired, a detent mechanism, such as shown at 28–31 of FIGURE 5, may be incorporated into magazine 130. A plurality of contacts, of which 142 and 145 are typical, are disposed annularly about the axis of disc insulator 151. The winding of solenoid 133 is connected between contact 140 and contact 150. Contact 149 is in wiping or sliding engagement with contact 150 which communicates with the common terminal of the power source via lead 148 and junction box 152. The wiping contact arrangements of contacts 149 and 150 as well as contacts 141 through 145 permit magazine 130 to rotate through approximately 360° about its cylindrical axis yet provide operating power to the winding of solenoid 133. The electrical circuit operation is best understood in connection with FIGURES 16 and 17.

There is shown in FIGURE 16 a fragmentary plan view of the keyboard portion of the apparatus of FIGURE 15. The keyboard includes a series of momentary-contact, push-button switches 155–164 and single-pole, single-throw switch 165, in a preferred embodiment of the apparatus. The keyboard is oriented with respect to the handpiece 105 so as to permit the handpiece to be placed into the vise and the keys thereafter selectively activated with a minimum excursion of the operator's hand thus facilitating utilization of the apparatus. The push button switches shown in FIGURE 16 are preferably of the type incorporating a series pilot lamp and a translucent cap which will cause the depressed switch to be illuminated during the time in which the associated circuit is closed.

The usefulness of this feature will be more clearly evident in connection with the discussion of the apparatus which follows in connection with FIGURE 17.

Looking now at FIGURE 17 the tool selection operation of the apparatus may be initiated by depressing switch 165. This will communicate power from a suitable source via the contacts of relay 190.

Relay 190 is in a de-energized condition prior to the closure of switch 165. Depressing switch 165 will complete a circuit to winding 191 of solenoid 133, via relay contacts 192 and 193. Upon depressing one of the selector buttons 157–164 and switch 165, the magazine may be indexed to a corresponding position. For example, assuming switch button 158 is depressed, a circuit will be completed through the relay winding 190, through the contacts of switch 158, thence to contact 142 which is physically located on insulator 151 of the apparatus. Inasmuch as power has been applied to winding 191 via switch 165, rotary solenoid 133 will be energized causing it to rotate. This will rotate wiper contact 141 until it reaches contact 142. Completion of the circuit from wiper contact 141 to contact 142 will cause relay winding 190 to be energized, thus opening contacts 192—193. This action will de-energize solenoid winding 191 causing shaft 134 to "catch-up" with the magazine position as described previously. The magazine will now be at rest at a position corresponding to switch 158. Now a tool may be inserted by depressing the "IN" switch 155 which will energize winding 119 causing injector pin 120 to move upward, forcing the tool from the magazine chamber into the handpiece. Alternatively, a tool may be ejected from the handpiece by depressing the "OUT" switch 156 thereby completing a circuit which energizes coil 107 causing the insertion plunger 106 to move downward. Pilot lamps within the switches will be illuminated until the circuit is broken, thus signalling the completion of the selected function. Relay 190 may be physically located within junction box 152. Also, it should be understood that rectifier means may be connected between the power plug 194 and the utilizing circuitry if it is desired to employ a D.-C. relay and D.-C. solenoids yet operate from an A.-C. supply line. Alternately, a relay and solenoids designed for operation from an A.-C. source may be employed, as will be obvious to those skilled-in-the-art.

After the desired operation has been accomplished the vise may be opened and the handpiece removed.

There is shown in FIGURE 18 an embodiment of the invention for use with handpieces of the type in which the tool must be inserted and withdrawn from the same side of the handpiece head, there being no transaxial opening through the chuck. The principal elements are supported by frame 300 which may be an integral element having a base portion and a pair of parallel upright portions 300' and 300". The head of the handpiece 301 is received and held in place by vise 302 and cover 303. The vise and cover are joined by means of hinge 304. There is carried directly beneath the vise a removable and interchangeable tool storage magazine 305, which may be of cylindrical shape. A plurality of storage chambers, of which 306 is typical, are disposed about the axis of the cylindrical magazine. The magazine 305 is adapted to turn about shaft 307. Each of the plurality of storage chambers is adapted to receive and carry an individual tool, 308 being typical. The magazine 305 may be detented at each storage position by any suitable means such as a detent mechanism of the type described in connection with FIGURE 5.

Manual operating lever 309 is pivoted on shaft 310 carried between the parallel uprights 300' and 300" of frame 300. Handle 311 may be depressed to operate the device, in which case it will assume the position shown in dotted outline at 311' of FIGURE 18.

Lever 309 has a forked end portion which carries shaft 329. Cylinder 312 is pivotally mounted on shaft 329. The diameter of cylinder 312 is such as to permit it to enter the lower opening of chamber 306. Insert 333 is carried within chamber 306 and carries two wing-extensions 330 and 331 which are in slidable engagement with mating grooves in chamber 306. There are no mating extensions of these grooves below the bottom surface of magazine 305 thus preventing insert 315 from falling out of the chamber 306. Insert 333 is provided with a central opening 328 of rectangular cross-section through which member 323 may pass. The upper portion of opening 328 has an enlarged circular recess 315 which is adapted to engage the end of tool 308 and align it with respect to insert 333 during the tool insertion operation. Coil spring 313 biases cylinder 312 downward, thus establishing the normal position of lever 309.

Assuming that the handpiece 310 is initially without a tool and a magazine chamber containing a tool is indexed beneath the vise, operation of the apparatus is as follows: Depression of handle 311 will cause lever 309 to urge cylinder 312 upward thereby compressing spring 313 which is restrained at its lower end by disc 314; disc 314 being attached to cylinder 312. Cylinder 312 will then enter chamber 306 and engage insert 333 carrying it upward. The bottom of recess 315, bearing against the bottom end of tool 308, will cause it to be pushed upward and inserted into the tool chuck of handpiece 310.

It should be understood that a guide fork 316 may be included in this modification and would function in a manner similar to that described in connection with fork 41 of the embodiment of FIGURE 1.

Upon releasing handle 311, lever 309 will be restored to its normal position under the action of spring 313, thereby restoring cylinder 312 to its original position. The vise cover 303 may then be opened and the handpiece withdrawn. The tool ejection or tool extraction elements of the apparatus of FIGURE 18 comprise a retractile mechanism controlled by a flexible shaft. Knob 317 is attached to shaft 319 which, in turn, is connected to flexible shaft 320 carried within sheath 321.

Assuming that the tool in the handpiece is to be ejected from the handpiece and placed into a storage chamber of the magazine the operation would be as follows: The handpiece 301 is inserted into vise 302 and vise cover 303 is then closed. Magazine 305 is then rotated to index an empty chamber 306 beneath vise 302. Upon depressing handle 311 cylinder 312 will enter the empty storage chamber 306. Thereafter knob 317 is depressed inward against bias spring 318. This action will result in shaft 319 urging flexible shaft 320 through sheath 321. The opposite end of flexible shaft 320 has carried thereon piston 322. Leaf spring member 323 is attached to piston 322 by any suitable means. The upper extremities of spring member 323 are provided with finger portions 324 and 325 as shown in FIGURE 19. Cam surfaces 326 and 327 control the opening and closing of fingers 324 and 325. It should be noted that these cam surfaces define a rectangular opening 328 as seen in FIGURE 21. FIGURE 21 is a cross-sectional view taken along line 21—21 of FIGURE 18. The rectangular shape of opening 328 prevents member 323 from turning about the axis of cylinder 312. Upon pushing in on knob 317, spring member 323 will be in the raised position as shown in dotted outline at 323'. As a result, fingers 324 and 325 will be caused to move inward and grasp or engage the shank 332 above the burr or end portion of tool 308. Thereafter, handle 311 may be released, thus causing lever 309 to return to its normal position under the action of spring 313. As cylinder 312 moves downward, member 323 will move with cylinder 312 and carry the tool downward into the chamber 306. The release of knob 317 will cause it to move outward to its normal position, under the action of spring 318, and restore member 323 to its retracted position.

While the embodiment just described employed manual operation, it will be obvious that power actuators may be added to perform the cyclic operations in a manner similar to that described in connection with the embodiment of FIGURE 15.

While there have been shown and described various embodiments of the invention for the purposes of teaching its principles, it should be understood that various other modification may be employed by those skilled in the art without departing from the intended scope of the invention. For example, hydraulic or pneumatic equivalents of the solenoid actuating elements shown in the power-driven embodiments of FIGURES 15 through 17 may be employed. It being well known that pressurized air and water sources are normally found in those locations in which the apparatus would customarily be used. Furthermore, it should be understood that the automatic tool changer of the invention need not be limited to dental tools and the like, but may be adapted for use with various other portable tools or rotary tools not adapted to prior types of tool changing mechanisms. Also, it should be understood that in certain applications only the tool insertion feature, or conversely—only the tool ejection feature, may be required. Thus, a dual function device may be simplified to encompass only the required feature. It is therefore intended that the invention be limited only by the appended claims.

What is claimed is:

1. An apparatus for loading and unloading a tool in a portable tool chuck comprising, a frame, vise means carried by said frame for selectively securing and holding said chuck for loading and unloading, magazine means containing a plurality of spaced-apart vertical tool compartments and being movably mounted on said frame so that said tool compartments may be moved into alignment with said chuck, first means movably mounted on said frame for engaging a tool located in one of said compartments and moving said tool into an empty tool chuck held by said vise means, and second means movably mounted on said frame for engaging a tool held in a loaded chuck within said vise means for moving said tool into an empty compartment of said magazine means.

2. An apparatus as defined in claim 1 wherein said first means comprises a power actuated pin adapted for reciprocation along the longitudinal axis of said tool and said compartment.

3. An apparatus as defined in claim 1 wherein said second means comprises a power actuated plunger adapted for reciprocation along the axis of said chuck.

4. An apparatus as defined in claim 1 wherein said second means comprises retractile finger means adapted to selectively engage or disengage said tool.

5. Apparatus for inserting a tool into a portable tool chuck comprising, a frame, means on said frame for receiving and holding said chuck, magazine means movably mounted on said frame and relatively movable with respect to said receiving and holding means for selectively positioning said magazine, said magazine means having a plurality of spaced-apart compartments each of which is adapted to carry a separate tool therein and selectively alignable with said chuck, and a tool injector pin adapted to enter a selected one of said compartments and displace a tool carried therein whereby said displaced tool is caused to engage said chuck.

6. Apparatus as defined in claim 5 wherein said magazine comprises a cylinder and said compartments are circularly disposed about the axis of said cylinder, said cylinder being rotatably carried on a shaft, said shaft being supported by said frame.

7. Apparatus as defined in claim 5 wherein said magazine comprises a rectangular member adapted for rectilinear translation with respect to said frame, said member having key means thereon for guiding the translatory movement thereof.

8. Apparatus as defined in claim 5 wherein said receiving and holding means comprises a fixed vise member and a movable vise member, said members being connected by hinge means to permit relative movement of said members between chuck holding and chuck releasing positions.

9. Apparatus for ejecting a tool from a portable tool chuck comprising, a frame, means carried on said frame for receiving and holding said chuck, tool storage means containing a plurality of vertical spaced-apart tool storage compartments adapted to receive tools ejected from said chuck, said tool storage means being rotatably mounted on said frame so that said tool storage compartments may be moved into alignment with said chuck, and a tool ejector pin adapted to engage said tool and enter said chuck in order to eject the tool carried therein into said storage means, biasing means operably disposed between said pin and said frame normally urging said pin away from the tool and said chuck.

10. Apparatus as defined in claim 9 wherein said storage means comprises a cylindrical magazine having a plurality of spaced-apart compartments circularly disposed about the axis of said cylinder, said cylinder being rotatably carried supported by said frame.

11. Apparatus as defined in claim 9 wherein said storage means comprises a rectangular magazine member adapted for rectilinear translation with respect to said frame, said member having key means thereon for guiding the translatory movement thereof.

12. Apparatus as defined in claim 9 wherein said receiving and holding means comprise a fixed vise member and a relatively movable vise member, said members being connected by hinge means to permit relative movement of said members between chuck holding and chuck releasing positions.

13. Apparatus for unloading a tool from a portable tool chuck comprising, a frame, hinged vise means carried on said frame for receiving and holding said chuck, tool storage means containing a plurality of spaced-apart tool compartments adapted to receive tools unloaded from said chuck, said tool storage means being movably mounted on said frame so that said tool compartments may be moved into alignment with said chuck, retractile finger means adapted to selectively engage or disengage said tool, and actuator means for rectilinearly translating said finger means to permit said finger means to first engage and withdraw said tool from said chuck and thereafter disengage and place said tool into said storage means.

14. An apparatus for loading and unloading a tool in a portable tool chuck comprising, a frame, vise means carried by said frame for selectively securing and holding said chuck for loading and unloading, magazine means relatively movable with respect to said vise means and containing a plurality of spaced-apart tool compartments, selectively-positionable, power-operated actuator means coupled to said magazine for selectively indexing a desired one of said compartments with respect to said vise means, tool insertion means movably mounted on said frame for engaging a tool located in a selectively indexed one of said compartments and moving said tool into an unloaded tool chuck held by said vise means, and tool ejector means movably mounted on said frame for engaging a tool held in a loaded chuck within said vise means for moving said tool into an empty compartment of said magazine means.

15. An apparatus as defined in claim 14 wherein said tool insertion means comprises a power-actuated pin adapted for reciprocation along the longitudinal axis of said tool and said compartment.

16. An apparatus as defined in claim 14 wherein said tool ejector means comprises a power-actuated plunger adapted for reciprocation along the axis of said chuck.

17. An apparatus as defined in claim 14 including keyboard selector means communicating with said actuator means for controlling the selective indexing of said actuator means and said magazine means.

18. An apparatus for loading and unloading a tool in a portable tool chuck comprising, a frame, vise means carried by said frame for selectively securing and holding said chuck for loading and unloading, magazine means relatively movable with respect to said vise means and containing a plurality of spaced-apart tool compartments, selectively-positionable, power-operated actuator means coupled to said magazine for selectively indexing a desired one of said compartments with respect to said vise means, a power-actuated pin movably mounted on said frame and adapted for reciprocation along the longitudinal axis of said tool and said compartment for engaging a tool located in a selected one of said compartments and moving said tool into an unloaded tool chuck held by said vise means, and power-actuated tool ejector means movably mounted on said frame and adapted for reciprocation along the axis of said chuck for engaging a tool held in a loaded chuck within said vise means for moving said tool into an empty compartment of said magazine means.

19. Apparatus for inserting a tool into a portable tool chuck comprising, a frame, means on said frame for receiving and holding said chuck, magazine means relatively movable with respect to said receiving and holding means and having a plurality of spaced-apart compartments each of which is adapted to carry a separate tool therein, a plurality of guide means each of which is located within and in slidable engagement with a corresponding one of said compartments, said guide means being adapted for engaging and aligning a tool in said corresponding compartment, and a tool insertion pin adapted to enter a selected one of said compartments and displace a tool carried therein whereby said displaced tool is caused to engage said chuck.

20. Apparatus for inserting a tool into a portable tool chuck comprising, a frame, a fixed vise member on said frame having a frusto-conical depression therein, a movable vise member having a raised frusto-conical portion adapted to mate with a complementary portion of said fixed vise member, said members being connected by hinge means to permit relative movement of said members between an open position for receiving said chuck and a closed position for holding said chuck, magazine means relatively movable with respect to said fixed vise member and containing a plurality of spaced-apart tool compartments, first means movably mounted on said frame for engaging a tool located in one of said compartments and moving said tool into an empty tool chuck held between said fixed vise member and said movable vise member, and second means movably mounted on said frame for engaging a tool held in a loaded chuck within said vise means for moving said tool into an empty compartment of said magazine means.

21. An apparatus for loading and unloading a tool in a portable tool chuck comprising, a frame, a vise member carried by said frame and having a lateral opening for receiving said chuck, detent means carried by said vise member for securing and holding said chuck in said opening for loading and unloading, magazine means relatively movable with respect to said vise member and containing a plurality of spaced-apart tool storage compartments, first means movably mounted on said frame for engaging a tool stored in one of said compartments and moving said tool into an unloaded tool chuck held by said detent means, and second means movably mounted on said frame for engaging a tool held in a loaded tool chuck held by said detent means for moving said tool into an empty storage compartment of said magazine means.

22. Apparatus for inserting a tool into a portable tool chuck comprising, a frame, vise means supported by said frame for receiving and holding said chuck, magazine means relatively movable with respect to said receiving and holding means and having a plurality of spaced-apart compartments each of which is adapted to carry a separate tool therein, a plurality of cylindrical insert means each of which is located within and in slidable engagement with a corresponding one of said compartments, and a tool insertion pin adapted to enter a selected one of said compartments and displace said insert means thus causing said insert means to engage and move said tool into said chuck.

23. An apparatus for loading and unloading a tool in a portable tool chuck comprising, a frame, vise means carried by said frame for selectively securing and holding said chuck for loading and unloading, magazine means relatively movable with respect to said vise means and containing a plurality of spaced-apart tool compartments, rotary solenoid means coupled to said magazine for positioning said magazine with respect to said vise means, selective switching means coupled to said solenoid means for selectively indexing a desired one of said compartments, a tool insertion pin movably mounted on said frame, first solenoid means coupled to said insertion pin for imparting a reciprocating motion thereto, first switch means connected to said first solenoid means whereby said solenoid may be energized to cause said insertion pin to engage a tool located in an indexed compartment and move said tool into an unloaded tool chuck held by said vise means, a tool ejector plunger movably mounted on said frame, second solenoid means coupled to said ejector plunger for imparting a reciprocating motion thereto, and second switch means connected to said second solenoid means whereby said second solenoid means may be energized to cause said ejector plunger to engage a tool held in a loaded chuck within said vise means for moving said tool into an empty compartment of said magazine means.

24. A tool loading and unloading apparatus for the tool chuck of a dental handpiece having a transaxial opening therethrough comprising, a frame, a fixed vise member secured to said frame, a relatively movable vise member, said members being connected by hinge means to permit relative movement of said members between handpiece holding and handpiece releasing positions, magazine means relatively movable with respect to said vise members and containing a plurality of spaced-apart tool compartments, first means movably mounted on said frame for engaging a tool located in one of said compartments and moving said tool into an empty tool chuck held by said vise members, and second means movably mounted on said movable vise member for engaging the shank end of a tool held in a loaded chuck by said vise members for moving said tool into an empty compartment of said magazine means.

25. A tool loading and unloading apparatus as defined in claim 24 wherein said first means comprises a solenoid actuated pin adapted for reciprocation along the longitudinal axis of said tool and said compartment.

26. A tool loading and unloading apparatus as defined in claim 24 wherein said second means comprises a solenoid actuated ejector means adapted for reciprocation along the axis of said chuck.

27. A tool loading and unloading apparatus as defined in claim 24 wherein said magazine comprises a cylinder and said compartments are circularly disposed about the axis of said cylinder, said cylinder being rotatably carried on a shaft, said shaft being supported by said frame.

28. A tool loading and unloading apparatus as defined in claim 24 wherein said magazine comprises a rectangular member adapted for rectilinear translation with respect to said frame, said member having key means thereon for guiding the translatory movement thereof.

29. Apparatus for ejecting a tool from a portable tool chuck comprising, a frame, means carried on said frame for receiving and holding said chuck, a tool ejector pin mounted on said frame adapted to engage said tool and enter said chuck in order to eject the tool carried therein, and said pin having a portion thereof projecting outwardly and exteriorly of said frame, and biasing means disposed between said frame and said pin portion urging said pin away from said chuck.

30. Apparatus for ejecting a tool from a portable tool chuck comprising, a frame, means carried on said frame for receiving and holding said chuck, a tool ejector pin slidably mounted on said frame adapted to engage said tool and enter said chuck in order to eject the tool carried therein, biasing means operably disposed between said pin and said frame normally urging said pin away from said tool and said chuck, and guide fork means carried on said holding means for selectively engaging and restraining said chuck during the ejection of said tool.

31. Apparatus for unloading a tool from a portable tool chuck comprising, a frame, a fixed vise member on said frame, a movable vise member, said vise members being connected by hinge means to permit relative movement of said members between an open position for receiving said chuck and a closed position for holding said chuck, magazine means relatively movable with respect to said fixed vise member and containing a plurality of spaced-apart tool storage compartments, ejector means movably mounted on said frame for engaging a tool held in a loaded chuck within said vise means for moving said tool into a selected one of said storage compartments of said magazine means, and guide fork means movably mounted on said fixed vise member and adapted to engage said tool chuck in the closed position of said vise members for restraining said chuck during the ejection of the tool from said loaded chuck.

32. A tool loading and unloading apparatus for the tool chuck of a dental handpiece having an axial opening therethrough comprising, a frame, a fixed vise member secured to said frame, a relatively movable vise member, said members being connected by hinge means to permit relative movement of said members between handpiece holding and handpiece releasing positions, guide fork means adapted to selectively engage said tool chuck during the handpiece holding position of said vise members, magazine means relatively movable with respect to said vise members and containing a plurality of spaced-apart tool compartments, first means movably mounted on said frame for engaging a tool located in one of said compartments and moving said tool to an empty tool chuck held by said vise members, and second means movably mounted on said movable vise member for engaging the shank end of a tool held in a loaded chuck by said vise members for moving said tool into an empty compartment of said magazine means.

33. Apparatus for inserting a tool into a portable tool chuck comprising, a frame, means on said frame for receiving and holding said chuck, magazine means relatively movable with respect to said receiving and holding means and having a plurality of spaced-apart compartments each of which is adapted to carry a separate tool therein, a plurality of guide means one of which is located within each of said compartments, said guide means each comprising a relatively movable element in slidable engagement with the compartment and a relatively stationary spring element for engaging and aligning a tool in said compartment, said relatively movable element being adapted to cause said spring element to selectively engage and disengage said tool, and a tool insertion pin adapted to enter a selected one of said compartments and displace said movable element and thereby cause the tool carried therein to engage said chuck.

34. Apparatus for loading and unloading a tool in a portable tool chuck comprising, a frame, means carried on said frame for receiving and holding said chuck, magazine means relatively movable with respect to said receiving and holding means and containing a plurality of spaced-apart tool compartments, insertion means adapted to engage a tool in a selected one of said tool compartments and urge said tool into engagement with said chuck, retractile finger means adapted to be selectively moved into and out of a selected one of said tool compartments, control means for operating said retractile finger means to selectively engage or disengage said tool, and lever means for rectilinearly translating said finger means to permit said finger means to withdraw said tool from said chuck when said finger means are in engagement with said tool and thereafter disengage and place said tool into said storage means.

References Cited in the file of this patent

UNITED STATES PATENTS

| | | |
|---|---|---|
| 2,256,543 | Auerbach | Sept. 23, 1941 |
| 2,296,087 | Burns | Sept. 15, 1942 |
| 2,360,158 | Parks | Oct. 10, 1944 |
| 2,509,572 | Marsilius | May 30, 1950 |
| 2,698,478 | Heisterkamp et al. | Jan. 4, 1955 |
| 2,901,927 | Morgan | Sept. 1, 1959 |
| 2,952,170 | Hansen | Sept. 13, 1960 |
| 2,956,454 | Hansen | Oct. 18, 1960 |